UNITED STATES PATENT OFFICE.

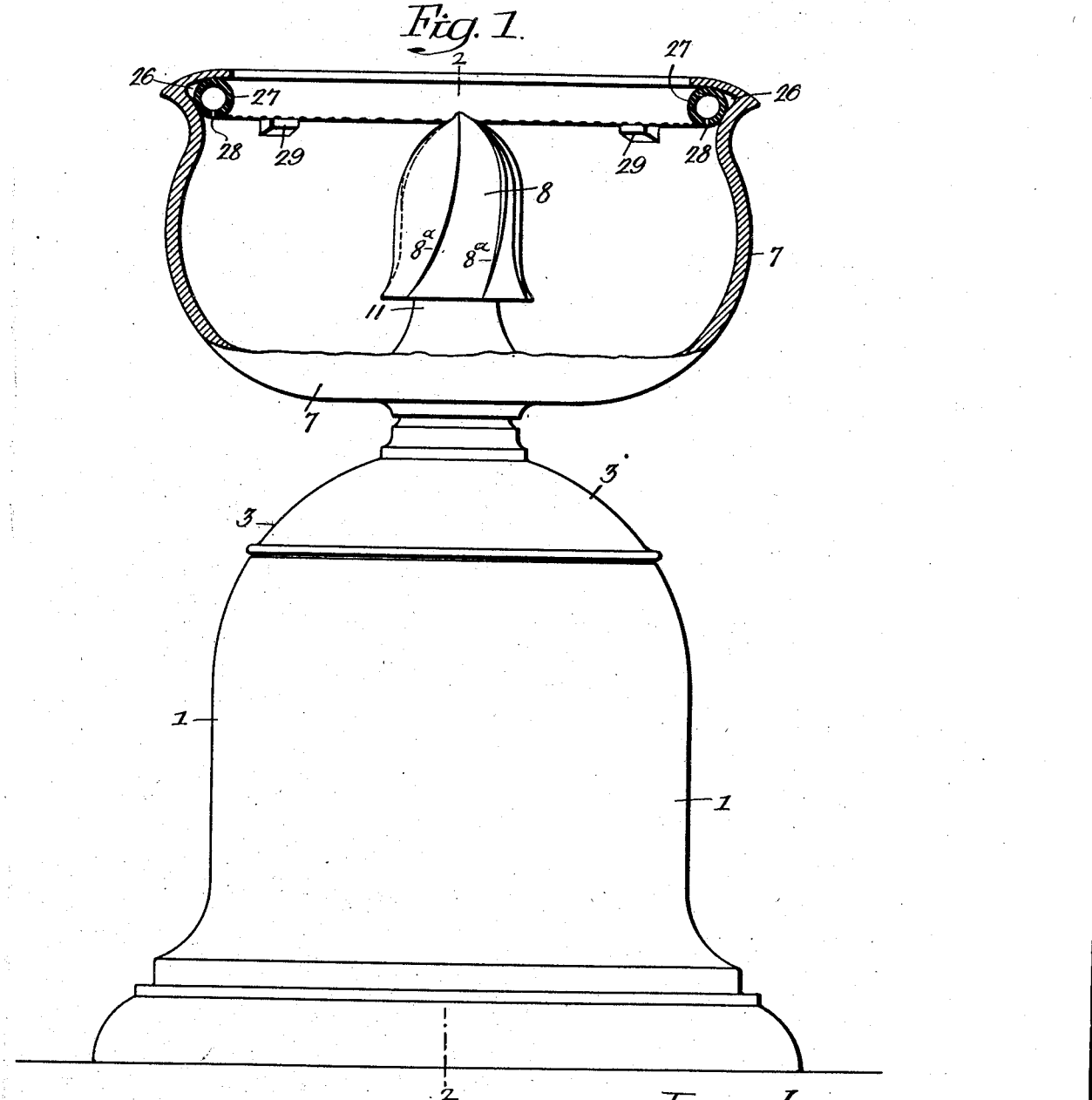

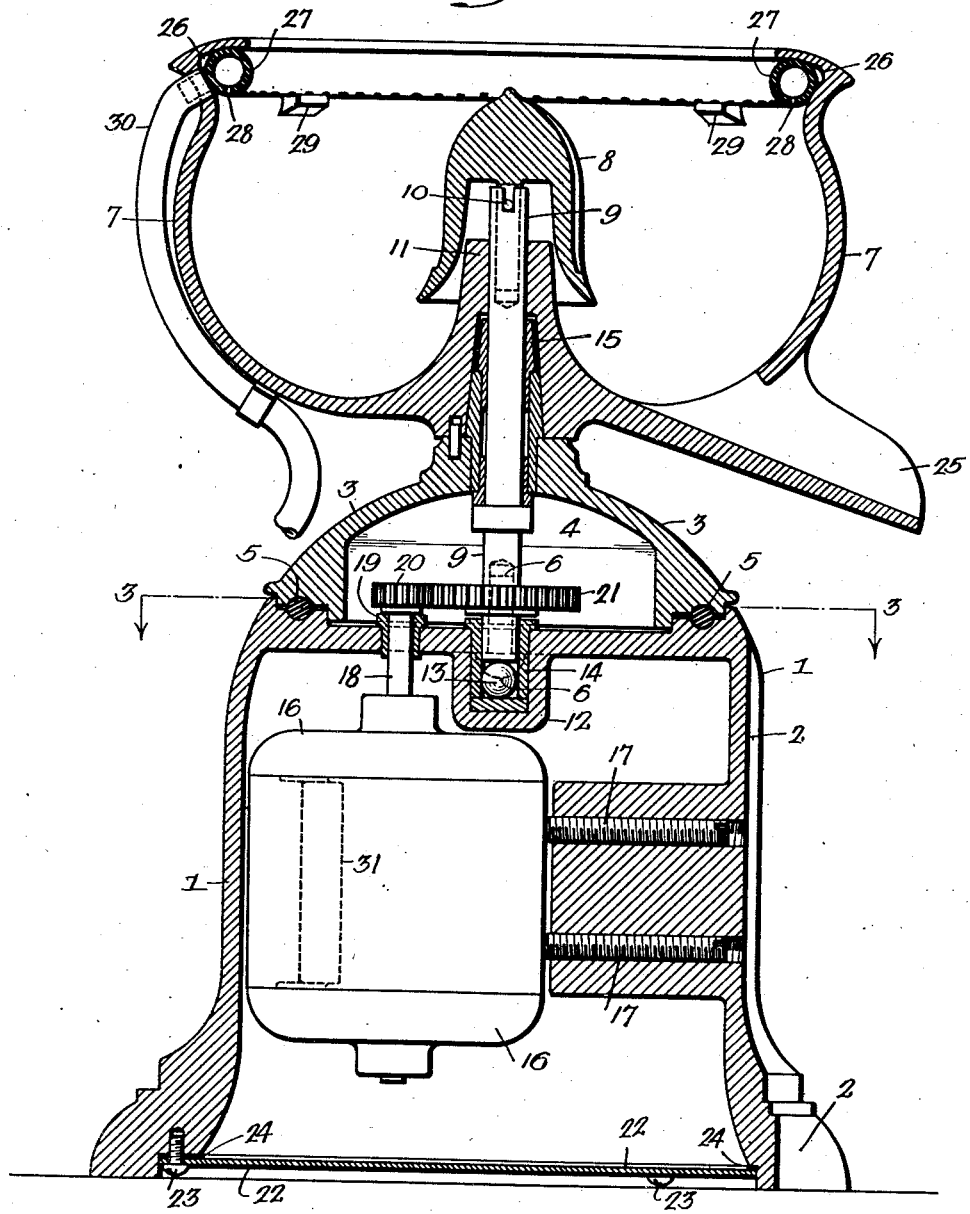

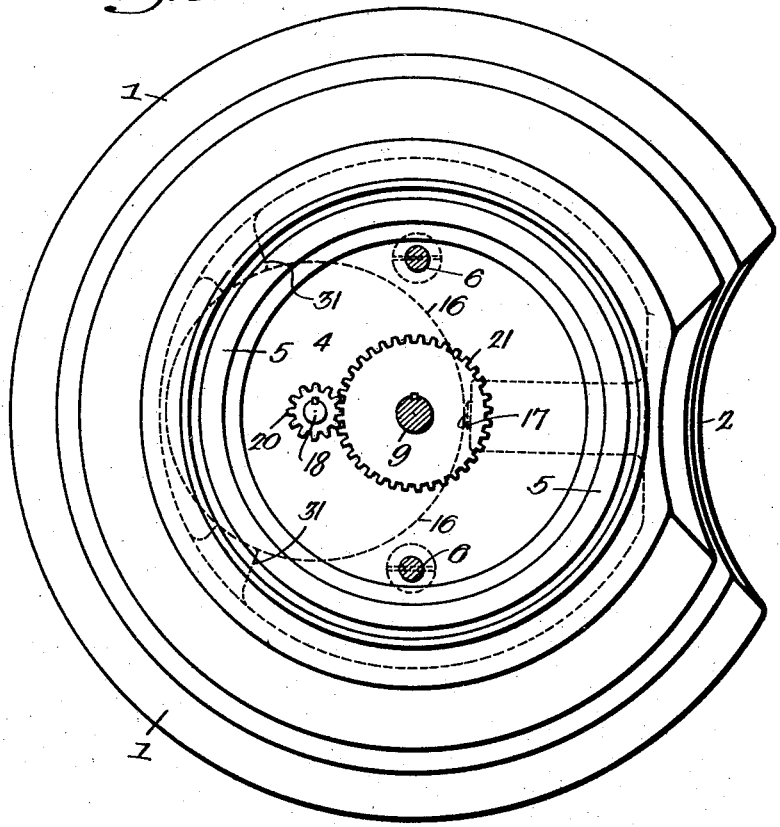
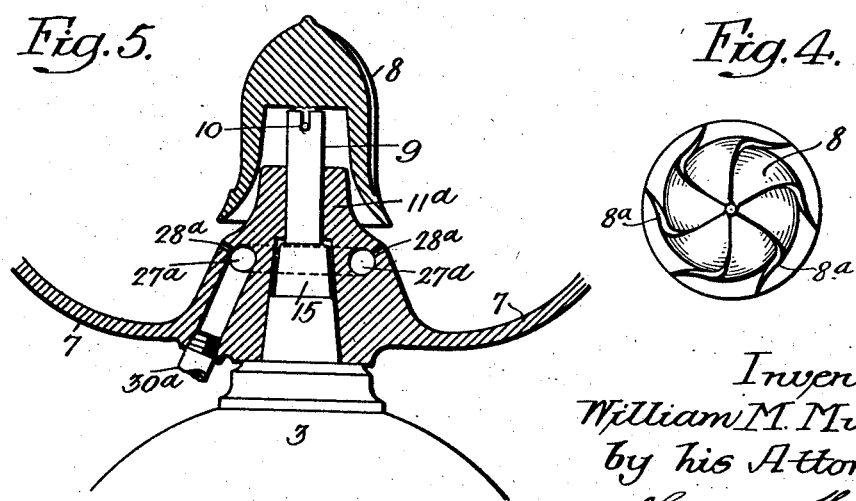

WILLIAM M. MURPHY, OF GLENSIDE, PENNSYLVANIA.

CITRUS-JUICE EXTRACTOR.

1,389,454.  Specification of Letters Patent.  Patented Aug. 30, 1921.

Application filed September 6, 1919. Serial No. 322,102.

*To all whom it may concern:*

Be it known that I, WILLIAM M. MURPHY, a citizen of the United States, and a resident of Glenside, county of Montgomery, State of Pennsylvania, have invented certain Improvements in Citrus-Juice Extractors, of which the following is a specification.

One object of my invention is to construct a power driven machine for extracting the juice of oranges, lemons and other citrus fruits and removing the pulp from the inedible sections without releasing the oil in the rind.

A further object of the invention is to provide means for spraying water into the bowl so as to cleanse the sides of the bowl and at the same time to utilize the water in diluting the juice when necessary.

A still further object of the invention is to construct the machine so that the juice from the fruit will not gain access to the bearings and the lubricant will not gain access to the interior of the bowl.

In the accompanying drawings:

Figure 1 is a side view showing the bowl, partly in section;

Fig. 2 is a vertical sectional view on the line 2—2, Fig. 1;

Fig. 3 is a sectional plan view on the line 3—3, Fig. 2;

Fig. 4 is a plan view of the extractor head; and

Fig. 5 is a sectional view illustrating a modification.

1 is the base of the apparatus, shaped as shown clearly in Fig. 3, and having a recess 2 for the glass, or other receptacle, which receives the juice. Mounted on the base is a cap plate 3 inclosing the chamber 4 formed by the top of the base and cap plate and in this chamber is the gearing. 5 is a gasket, which can be placed between the parts so that when the parts are clamped together by screws 6 in any usual manner, the chamber is sealed. Mounted on the cap plate is the bowl 7, in which is located the extractor head 8 shaped as shown in Fig. 1. This head is hollow as shown in Fig. 2, and is detachably secured to a shaft 9 by a pin-and-slot connection. The shaft extends through the standard 11, projecting into the bowl and through the cap plate and rests on a step bearing 12 in the base 1, the bearing, in the present instance, being in the form of a ball 13. A bushing 14 surrounds the lower end of this shaft within the casing and mounted between the bowl and cap plate is a bushing 15. The upper end of this bushing is tapered to fit the tapered opening in the bottom of the bowl. By this construction, the juice cannot gain access to the chamber 4, nor can any lubricant work up from the chamber into the bowl.

Mounted in the base is an electric motor 16, secured therein by screws 17, which hold the motor against lugs 31 forming a three point support. 18 is the shaft of the motor, which projects through a bushing 19 in the upper portion of the base and on this shaft is a pinion 20, which meshes with a gear wheel 21 on the shaft 9.

In the base is a plate 22 secured thereto by screws 23 and between the plate and the base is a gasket 24. This construction makes a water-tight joint, preventing access of moisture to the motor.

The bowl 7 is shaped as shown in Fig. 2 and has a spout 25 which extends over the recessed portion 2 in the base so that juice will flow from the bowl directly into a receptacle. In the upper end of the bowl is an annular groove 26, in which is located a rubber pipe or tube 27 perforated at 28. This pipe is held in place by a series of lugs 29. The perforations are so arranged that the water passing from the pipe will be discharged against the sides of the bowl and will keep the sides of the bowl washed. The amount of water will depend upon the number of oranges, or other fruit, acted upon. The pipe 27 is connected by a supply pipe 30 to any water pressure system.

In the present instance, the pipe 28 is in the form of a cast rubber tube having a projection which extends through the bowl and is attached to the supply pipe 30, but it will be understood that the pipe may be made of any material.

The extractor head is preferably made as shown in Figs. 1 and 4 and has blades $8^a$, which are helically arranged and slightly curved at the upper end and comparatively straight at the lower end terminating at an angle so that if one-half of an orange be placed on this head, the blades, as the head is rotated, will extract the juice and pulp without removing the skin of the division walls of the sections. This is accomplished very quickly and the juice, with the water escaping from the tube, passes to the receptacle.

A juice extractor of the above construction can be made inexpensively and is absolutely rigid in construction. It is so designed that no moisture can gain access to the electric motor. The lubricant cannot enter the bowl. The extracting head is so shaped that it will quickly and thoroughly extract the juice and will remove the pulp without cutting, to a material extent, the skin of the sections, or cutting into the rind of the orange, or lemon, being acted upon.

While I have shown the means for supplying water to wash down the walls of the bowl located in the upper portion thereof, it may be located in other portions such, for instance, as in Fig. 5, in which the tube 27ᵃ is cast in the central portion of the bowl and the perforations 28ᵃ are so located as to project water against the walls of the bowl.

I claim:

1. In a juice extractor having a base; a bowl mounted on the base; an extractor head located in the bowl, and means for rotating said head; the combination of means located in the bowl for supplying water to wash down the walls of the bowl.

2. In a juice extractor having a base; a bowl mounted on the base; an extractor head located in the bowl; and means for rotating said head; the combination of a water supply pipe near the upper edge of the bowl for supplying water to the bowl.

WILLIAM M. MURPHY.